United States Patent [19]

Rassieur et al.

[11] Patent Number: 4,585,256

[45] Date of Patent: Apr. 29, 1986

[54] SIDE FEED WATER SWIVEL

[75] Inventors: Charles L. Rassieur, Creve Coeur, Mo.; Dean T. Pierce, Chandler, Ariz.

[73] Assignee: Central Mine Equipment, St. Louis, Mo.

[21] Appl. No.: 667,095

[22] Filed: Nov. 1, 1984

[51] Int. Cl.[4] .................. F16L 27/00; E21B 17/18
[52] U.S. Cl. .................................. 285/190; 285/321;
175/214; 277/59
[58] Field of Search ............... 285/190, 12, 15, 321,
285/134; 175/214, 210; 277/59, 70, 72 FM;
173/73, 78; 137/580

[56] References Cited

U.S. PATENT DOCUMENTS

| 1,985,012 | 12/1934 | Boehm | 285/190 |
|---|---|---|---|
| 2,345,884 | 4/1944 | Powers et al. | 277/59 X |
| 2,506,111 | 5/1950 | Saint | 277/70 X |
| 3,164,420 | 1/1965 | Cramer | 277/59 X |
| 3,227,230 | 1/1966 | Lagerstrom | 175/214 |
| 3,259,403 | 7/1966 | Hjalsten et al. | 173/73 |
| 4,302,019 | 11/1981 | Hotger | 277/59 X |
| 4,520,879 | 6/1985 | MacElvain | 285/190 X |

Primary Examiner—Cornelius J. Husar
Assistant Examiner—Peter M. Cuomo
Attorney, Agent, or Firm—Polster, Polster and Lucchesi

[57] ABSTRACT

A side feed water swivel for a hollow drill string includes a spindle one end of which is adapted to fit a socket on a rotary table of a drill rig, and the other end, to connect to hollow drill rods, and, intermediate its ends, a receiving section having upper and lower smooth cylindrical bearing surfaces and between them water-receiving passages extending to an axial passage blind at its upper end, and a housing embracing the bearing surfaces and defining between them a water-receiving chamber. The housing has an inlet port extending through a wall to communicate with the chamber substantially midway axially of the housing. The housing has upper and lower bearing surfaces complementary to the spindle bearing surfaces. O-ring channels in the housing bearing surfaces are positioned axially asymmetrically with respect to the center line of the housing. The housing is so made that it can be mounted on the spindle in either of two orientations 180° apart so that when one pair of sealing surfaces is worn, the housing can be removed from the spindle, inverted and remounted to permit the O-rings in the channels to engage a new set of sealing surfaces.

2 Claims, 3 Drawing Figures

4,585,256

SIDE FEED WATER SWIVEL

BACKGROUND OF THE INVENTION

A side feed water swivel provides rotary seals so that when drilling fluid is pumped into the swivel, hence through hollow drill rods and a drill bit, the pressurized fluid will not pass by the seals. The fluid often contains abrasive particles such as sand that cause wear between the seals and the sealing surfaces. When the spindle surface wears to the point that fluid can leak past the seal, the spindle needs to be replaced. In side feed water swivels known heretofore, the seals are so arranged that the spindle must be replaced the first time they begin to leak.

One of the objects of this invention is to provide a water swivel which provides double the useful life of the spindle as compared with conventional swivels.

Other objects will become apparent to those skilled in the art in the light of the following description and accompanying drawing.

SUMMARY OF THE INVENTION

In a side feed water swivel for a hollow drill string including a spindle one end of which is adapted to fit a socket on a rotary table of a drill rig, and the other end, to connect to hollow drill rods, and, intermediate its ends, a receiving section having upper and lower smooth cylindrical bearing surfaces and between them water-receiving passages communicating with an axial passage blind at its upper end, and a housing embracing the bearing surfaces and defining between them a water-receiving chamber, the housing having an inlet port extending through a wall to communicate with the chamber substantially midway axially of the housing and upper and lower bearing surfaces complementary to the spindle bearing surfaces, O-ring channels in the housing bearing surfaces are positioned axially asymmetrically with respect to the center line of the housing. The housing is so made that when one pair of sealing surfaces is worn, the housing can be turned over to permit the O-rings in the channels to engage a new set of sealing surfaces.

DESCRIPTION OF THE PREFERRED EMBODIMENT

Figure 1:
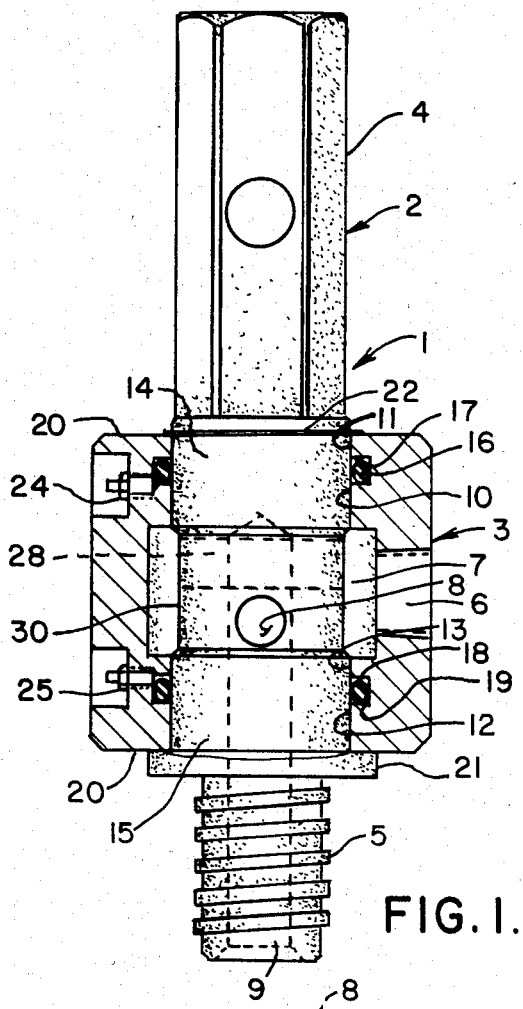
FIG. 1 is a view in front elevation, partly in section and partly broken away, of one embodiment of water swivel of this invention.

Referring now to the drawing for one illustrative embodiment of side feed water swivel of this invention, reference numeral 1 indicates an assembled swivel. The swivel 1 has a spindle 2 and a housing 3.

A top part 4 of the spindle 2 takes the form of a hexagonal shank adapted to fit a hexagonal socket on the rotary table of a drill rig. A bottom part 5 of the spindle has a drill rod thread to connect to hollow drill rods that in turn connect to a drill bit. Between upper and lower parts 4 and 5, the spindle is provided with an intermediate fluid section, including an upper spindle bearing surface 14, cylindrical and smooth, and a lower spindle bearing surface 15, also cylindrical and smooth. Between the surfaces 14 and 15, in this embodiment, the intermediate section is reduced in diameter to form a chamber section 30. One passage 8 extends diametrically through the spindle immediately above the lower bearing surface 15, and another passage 28 extends diametrically, at right angles to the axis of the hole 8, through the spindle immediately below the upper bearing surface 14. The passages 8 and 28 communicate with an axial passage 9, blind at its upper end immediately above the passage 28, and opening at its lower end through the bottom of the lower part 5 of the spindle. At the upper end of the lower part 5, at the lower margin of the bearing surface 15, the spindle has a flange 21 with a radially flat upper surface. At the upper end of the bearing surface 14, a snap ring groove 23 is machined. When the swivel is assembled, a snap ring 22 is mounted in the groove 23, caging the housing 3 between the snap ring 22 and the upper surface of the flange 21.

The housing 3 has an inlet port 6 adapted to connect the housing to a high pressure hose from the discharge side of a water pump. The housing is hollow and has upper, cylindrical, axially extending bearing surfaces 10 and 11, separated by an annular upper O-ring channel 17, and lower bearing surfaces 12 and 13, separated by a lower O-ring channel 19. Grease fittings 24 and 25, set for protection in wells in the housing wall, communicate with the channels 17 and 19, respectively. An O-ring 16 is seated in the channel 17, and an O-ring 18, in the channel 19. Bearing surfaces 10 and 11 embrace spindle bearing surface 14, and housing bearing surfaces 12 and 13 embrace the lower spindle bearing surface 15, the O-rings 16 and 18 engaging sealingly the bearing surfaces 14 and 15. The housing 3, which can be made from bronze, has radially flat top and bottom surfaces 20. In this embodiment, the inside diameter of the housing between the inner edges of the surfaces 11 and 12 is enlarged, to provide, with the chamber area 30 of the spindle, a fluid receiving chamber 7 with which the inlet port 6 communicates.

In the embodiment shown, the center line of the inlet port 6 is axially midway between the surfaces 20 of the housing 3. As is evident from the drawings, the axial height of the bearing surface 10 is greater than that of the bearing surface 1, and the axial height of the bearing surface 12 is greater than that of the bearing surface 13, although the total height of the surfaces 10 and 11 is the same as that of the surfaces 12 and 13. Stated another way, the distance from the axial center of the housing to the center of the channel 17 is greater than the distance from the center of the housing to the center of the channel 19.

Figure 2:
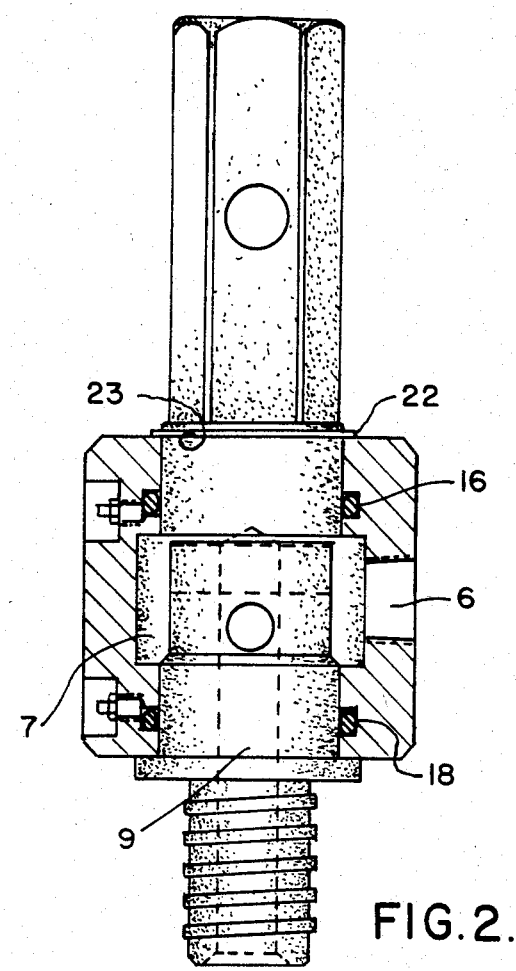
FIG. 2 is a view in front elevation, partly in section, of the device shown in FIG. 1, with the housing inverted.
Figure 3:
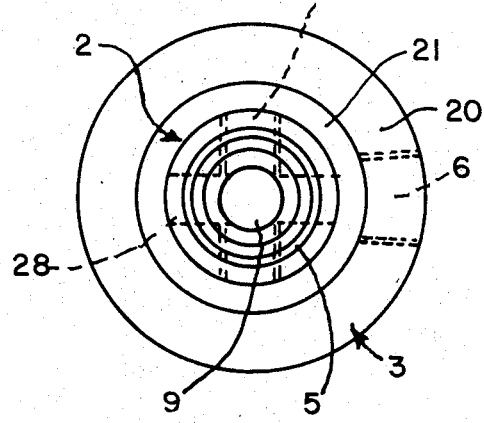
FIG. 3 is a bottom plan view with axial passages shown in dotted lines.

As is evident by comparison of FIGS. 1 and 2, when the housing 3 is inverted with respect to the spindle, the O-ring seals bear upon different areas of the spindle bearing surfaces 14 and 15. In this way, when the seals begin to leak when the housing has been initially installed in the position shown in FIG. 1, the snap ring 22 is removed, the housing is slipped off the spindle, inverted (oriented 180° from the original orientation of the housing) and replaced as shown in FIG. 2, and the spindle can be used until a new area engaged by the O-rings has worn to the place at which leakage begins, thus providing double the life of the spindle had the O-rings been positioned symmetrically around the center line of the housing.

Numerous variations in the construction of the water swivel of this invention, within the scope of the appended claims, will occur to those skilled in the art in the light of the foregoing disclosure. Merely by way of example, packing different from an O-ring can be used, although O-rings are preferred. The upper and lower parts of the spindle can be designed differently, their particular design forming no part of the invention. These are merely illustrative.

We claim:

1. In a side feed water swivel for a hollow drill string wherein a housing embraces and extends between spaced cylindrical bearing surfaces on a rotary spindle with an axial, liquid-receiving passage in it and at least one inlet port located, axially, between said bearing surfaces, and extending between said passage and an exterior surface of said spindle, said housing having spaced upper and lower bearing surfaces each interrupted by an annular channel in which packing is mounted and a fluid-receiving chamber axially intermediate said bearing surfaces and surrounding said inlet port and communicating therewith, the improvement comprising said housing being mountable on said spindle in first and second orientations 180° different from one another, said fluid-receiving chamber embracing said inlet port and communicating therewith in both said orientations, and said packing-receiving channels being positioned asymmetrically with respect to said bearing surfaces in a direction axially along said bearing surfaces, whereby packing in said channels engages different bearing surface areas of said spindle when the said housing is in its second orientation from the areas it engages in its first orientation.

2. The improvement of claim 1 wherein the packing in each channel is an O-ring.

* * * * *

UNITED STATES PATENT AND TRADEMARK OFFICE
CERTIFICATE OF CORRECTION

PATENT NO. : 4,585,256

DATED : April 29, 1986

INVENTOR(S) : Charles L. Rassieur and Dean T. Pierce

It is certified that error appears in the above-identified patent and that said Letters Patent is hereby corrected as shown below:

Column 2, line 48 "1" should be "11".

Signed and Sealed this

Twenty-sixth Day of August 1986

[SEAL]

Attest:

Attesting Officer

DONALD J. QUIGG

Commissioner of Patents and Trademarks